United States Patent
Montes Parra et al.

(10) Patent No.: US 10,801,516 B2
(45) Date of Patent: Oct. 13, 2020

(54) TURBOMACHINE ROTOR BLADE

(71) Applicant: SAFRAN AIRCRAFT ENGINES, Paris (FR)

(72) Inventors: Roger Felipe Montes Parra, Moissy-Cramayel (FR); Prasaad Cojande, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 37 days.

(21) Appl. No.: 15/751,520

(22) PCT Filed: Aug. 5, 2016

(86) PCT No.: PCT/FR2016/052043
§ 371 (c)(1),
(2) Date: Feb. 9, 2018

(87) PCT Pub. No.: WO2017/025684
PCT Pub. Date: Feb. 16, 2017

(65) Prior Publication Data
US 2018/0231017 A1    Aug. 16, 2018

(30) Foreign Application Priority Data
Aug. 11, 2015  (FR) .................................. 15 57660

(51) Int. Cl.
*F01D 5/14*  (2006.01)
*F04D 29/38*  (2006.01)
*F04D 29/32*  (2006.01)

(52) U.S. Cl.
CPC ........... *F04D 29/384* (2013.01); *F01D 5/141* (2013.01); *F04D 29/324* (2013.01);
(Continued)

(58) Field of Classification Search
CPC .... F04D 29/384; F04D 29/324; F04D 29/544; F04D 29/563; F04D 29/386; F01D 5/141;
(Continued)

(56) References Cited

U.S. PATENT DOCUMENTS 1,829,179 A * 10/1931 Back ........................ B23P 15/04
416/232
2,752,258 A * 6/1956 Swentzel ............... C04B 35/565
501/92
(Continued)

FOREIGN PATENT DOCUMENTS

EP    1930600 A2 *  6/2008  ............. F01D 5/141
GB    2 151 310 A    7/1985
(Continued)

OTHER PUBLICATIONS

International Search Report dated Nov. 16, 2016, in PCT/FR2016/052043 filed Aug. 5, 2016.
(Continued)

*Primary Examiner* — Woody A Lee, Jr.
*Assistant Examiner* — Brian Christopher Delrue
(74) *Attorney, Agent, or Firm* — Oblon, McClelland, Maier & Neustadt, L.L.P.

(57) ABSTRACT

A field of turbomachine rotor blades, and in particular a turbomachine rotor blade including a blade root and a blade tip spaced apart by a blade height, together with at least one intermediate segment presenting a negative tangential slope, and a distal segment situated between the intermediate segment and the blade tip and presenting a positive tangential slope, wherein the distal segment extends over at most 30% of said blade height.

16 Claims, 9 Drawing Sheets

(52) U.S. Cl.
CPC ...... *F05D 2240/20* (2013.01); *F05D 2250/71* (2013.01); *Y02T 50/671* (2013.01); *Y02T 50/673* (2013.01)

(58) Field of Classification Search
CPC . F05D 2250/71; F05D 2250/74; Y02T 50/673
USPC .......................................................... 416/238
See application file for complete search history.

(56) References Cited

U.S. PATENT DOCUMENTS

| | | | | |
|---|---|---|---|---|
| 3,127,093 | A * | 3/1964 | Sudrow | B64C 11/001 415/66 |
| 4,737,077 | A | 4/1988 | Vera | |
| 5,249,922 | A * | 10/1993 | Sato | F01D 5/142 415/191 |
| 6,071,077 | A * | 6/2000 | Rowlands | F01D 5/141 416/223 A |
| 6,331,100 | B1 * | 12/2001 | Liu | F04D 29/324 416/238 |
| 7,121,792 | B1 | 10/2006 | Fessou et al. | |
| 7,654,075 | B2 * | 2/2010 | Udall | F01D 9/041 60/226.1 |
| 8,167,567 | B2 * | 5/2012 | Kirchner | F01D 5/141 416/223 R |
| 8,684,698 | B2 * | 4/2014 | Breeze-Stringfellow | F01D 5/141 416/223 A |
| 8,702,398 | B2 * | 4/2014 | Breeze-Stringfellow | F01D 5/141 416/242 |
| 9,074,483 | B2 * | 7/2015 | Breeze-Stringfellow | F01D 5/141 |
| 9,506,347 | B2 * | 11/2016 | Key | F01D 5/141 |
| 2006/0210395 | A1 * | 9/2006 | Schuster | F01D 5/141 415/208.1 |
| 2007/0084218 | A1 * | 4/2007 | Udall | F01D 9/041 60/796 |
| 2008/0131271 | A1 * | 6/2008 | Wood | F01D 5/141 415/191 |
| 2008/0131272 | A1 * | 6/2008 | Wood | F01D 5/142 415/199.5 |
| 2010/0054946 | A1 * | 3/2010 | Orosa | F04D 29/324 416/223 R |
| 2012/0244005 | A1 * | 9/2012 | Breeze-Stringfellow | F01D 5/141 416/223 A |
| 2013/0266451 | A1 * | 10/2013 | Pesteil | F01D 5/141 416/223 R |
| 2015/0118059 | A1 | 4/2015 | Perrot et al. | |
| 2018/0231018 | A1 * | 8/2018 | Smith | F01D 5/141 |
| 2018/0231021 | A1 * | 8/2018 | Wilson | F01D 5/141 |

FOREIGN PATENT DOCUMENTS

| | | |
|---|---|---|
| JP | 60-178902 | 9/1985 |
| JP | 9-60501 | 3/1997 |
| JP | 2001-193692 | 7/2001 |
| JP | 2013-545936 | 12/2013 |
| WO | WO 2012/080669 A1 | 6/2012 |

OTHER PUBLICATIONS

Combined Chinese Office Action and Search Report dated Jun. 28, 2019 in Patent Application No. 201680058482.3, 10 pages (with English translation).

English translation of Russian Federation Office Action and Search Report dated Nov. 25, 2019 in Patent Application No. 2018108196/06(012682), 6 pages.

Translation of Japanese Office Action dated Jul. 14, 2020 in Japanese Application No. 2018-506937.

* cited by examiner

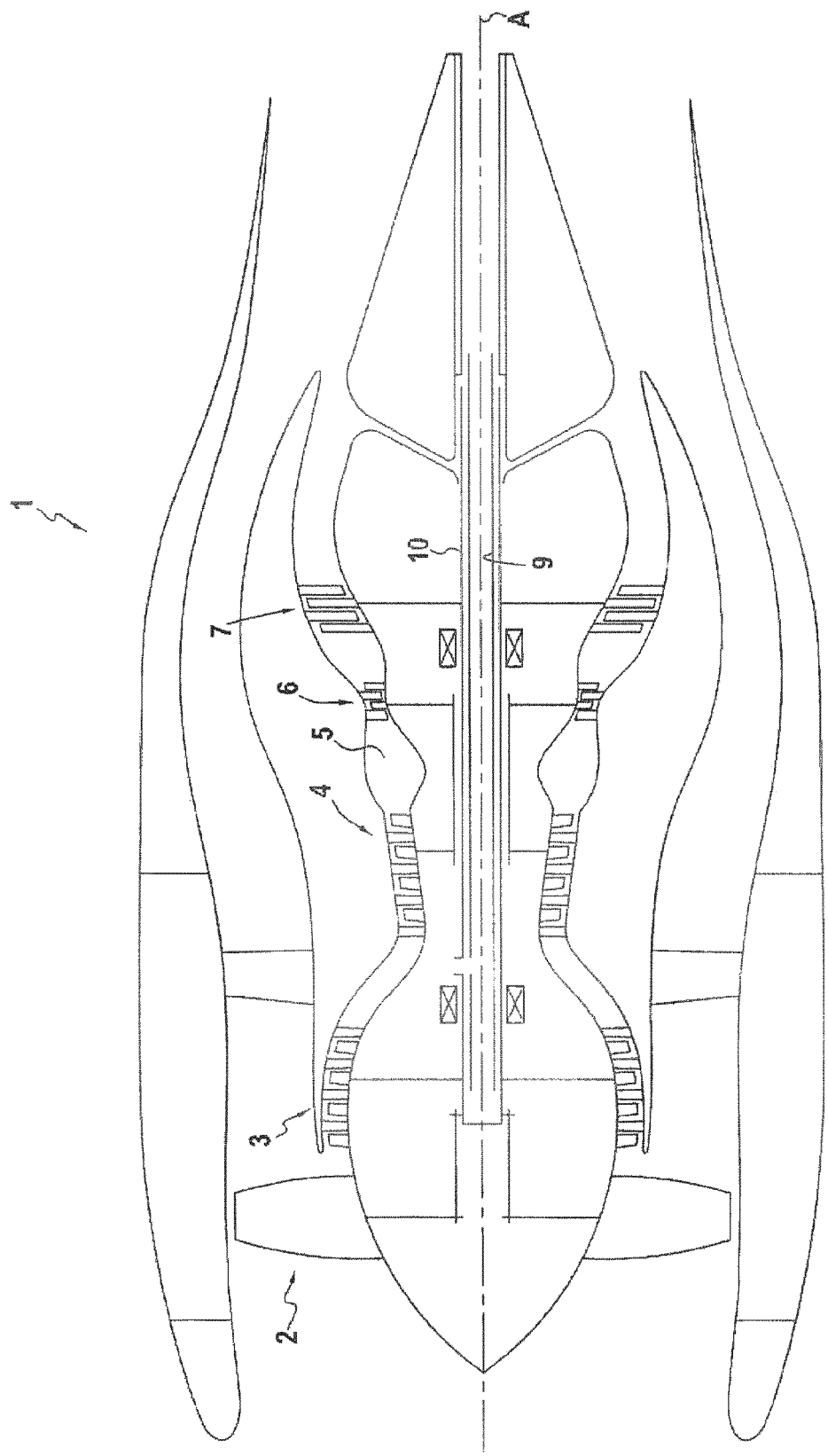

TURBOMACHINE ROTOR BLADE

BACKGROUND OF THE INVENTION

The present invention relates to the field of turbomachine blades or vanes, and in particular the field of turbomachine rotor blades.

The term "turbomachine" is used in the present context to designate any machine in which energy can be transferred between a fluid flow and at least one set of blades, such as for example: a compressor, a pump, a turbine, or indeed a combination of at least two of these. In the description below, the terms "upstream" and "downstream" are defined relative to the normal flow direction of the fluid through the turbomachine.

Such a turbomachine may comprise a plurality of stages, each stage normally comprising two sets of blades and vanes, specifically a set of moving blades and a set of guide vanes. Each set of blades or vanes comprises a plurality of blades or vanes that are offset from one another in a lateral direction. Typically, such blades or vanes are arranged radially around a central axis A. Thus, such a set forms a rotor, when it is a set of moving blades, or a stator when it is a set of guide vanes. The proximal end of each blade or vane relative to the central axis A is normally referred to as its root, while the distal end is normally referred to as its tip. The distance between the root and the tip is referred to as the "height". Between its root and its tip, a blade or vane is made up of a stack of aerodynamic profiles that are substantially perpendicular to a radial axis Z. The term "substantially perpendicular" is used in this context to mean that the plane of each profile may present an angle close to 90°, e.g. lying in the range 60° to 120°, relative to the radial axis Z.

The geometrical shape of blades is the subject of major design efforts in order to optimize the aerodynamic behavior of blades, thereby increasing the efficiency of the rotary assemblies such as compressors, fans, or turbines, of which they form a part. Thus, aerodynamic engineers propose relationships for stacking aerodynamic profiles that are optimized from the aerodynamic point of view.

Nevertheless, such stacking relationships are not necessarily optimized, nor even acceptable, from a mechanical point of view. For example, stacking relationships that are particularly effective from an aerodynamic point of view have been proposed in which a major portion of the blade is cantilevered out relative to the remainder of the blade. Such a large cantilevered-out mass is then highly sensitive to centrifugal forces resulting from the rotation of the rotor and leads to significant bending of the high portion of the airfoil, thereby leading to large mechanical stresses in the middle of the airfoil with static stresses that are too high at the "red line" flight point, i.e. the emergency flight point. Under such circumstances, such blades have only a very small dynamic margin and, in the event of an impact or in the event of the rotary assembly surging, they withstand fatigue poorly.

Conversely, other stacking relationships that are optimized from a mechanical point of view have been proposed by mechanical engineers, but they have not been accepted because of their aerodynamic performance being insufficient.

There therefore exists a real need for a blade that benefits both from good aerodynamic properties and from good mechanical properties.

OBJECT AND SUMMARY OF THE INVENTION

The present description relates to a turbomachine rotor blade comprising a blade root and a blade tip separated by a blade height, together with at least one intermediate segment presenting a negative tangential slope, and a distal segment situated between the intermediate segment and the blade head and presenting a positive tangential slope, when the distal segment extends over at most 30% of said blade height.

Such a configuration makes it possible to greatly reduce the mass of the blade that is cantilevered out, and thus to reduce the bending of the high portion of the blade, and simultaneously reduce the level of static stresses, while preserving good aerodynamic properties.

Furthermore, the mechanical strength improvements as obtained in this way make it possible to lighten the structure of the blade, and in particular to reduce its thickness, thereby improving its aerodynamic properties.

Also, this stacking relationship leaves design freedom concerning the geometrical shape of the blade in the axial direction, thereby making it possible to optimize the blade freely in this direction in order to optimize its aerodynamic and/or mechanical properties as a function of specific requirements.

In certain embodiments, said distal segment is directly adjacent to said blade tip.

In certain embodiments, said distal segment is directly adjacent to said intermediate segment.

In certain embodiments, the junction between said intermediate segment and said distal segment is situated at a level lying in the range 75% to 80% of the height of the blade from the blade root.

In certain embodiments, said distal segment extends over at most 25% of the blade height. This further reduces the cantilevered-out mass.

In certain embodiments, said distal segment extends over at least 5% of the blade height.

In certain embodiments, said distal segment extends over at least 15% of the blade height.

In certain embodiments, the projection onto a radial plane of the line passing through the centers of gravity of each of the tangential sections of the blade is gamma-shaped. The curve plotting the tangential coordinate, known as yG, of the center of gravity of each section of the blade as a function of its position along the blade thus presents a substantially rectilinear rising segment, imparting increased stiffness to the lower portion of the blade, and a subhorizontal segment that leaves only a small weight cantilevered out. Furthermore, the pronounced curvature at the interface between the intermediate segment and the distal segment of the blade serves to break the force path between the high portion and the low portion of the blade, thereby serving to reduce the magnitude of the stresses generated in the low portion of the blade as a result of bending in the high portion of the blade.

In certain embodiments, the projection onto a radial plane of the line passing through the centers of gravity of each tangential section of the blade possesses, in the intermediate segment of the blade, a segment that is substantially rectilinear. In other words, the curve plotting the tangential coordinate yG as a function of position possesses a second derivative that is substantially zero in this segment. This leads to greater stiffness in the intermediate segment of the blade, thus reinforcing its mechanical strength.

In certain embodiments, said substantially rectilinear segment extends over at least 30% of the blade height, preferably over at least 40% of the blade height, more preferably over at least 50% of the blade height.

In certain embodiments, said substantially rectilinear segment extends at least to a level situated at 50%, preferably 55%, preferably 60%, more preferably 65% of the blade height from the blade root.

In certain embodiments, said substantially rectilinear segment extends at least from a level situated at at most 30%, preferably at most 20%, of the blade height from the blade root.

In certain embodiments, the difference between the tangential coordinates of the centers of gravity of the blade sections situated firstly at the blade tip and secondly at the interface between the intermediate segment and the distal segment is greater than 150%, preferably greater than 180%, of the difference between the tangential coordinates of the centers of gravity of the blade sections situated firstly at the blade root and secondly at the interface between the intermediate segment and the distal segment. Such a blade has a large amount of sweep at the blade tip and benefits from good aeronautical and mechanical properties, in particular in terms of static stresses.

In other embodiments, the difference between the tangential coordinates of the centers of gravity of the blade sections situated firstly at the blade tip and secondly at the interface between the intermediate segment and the distal segment lies in the range 100% to 150%, preferably in the range 110% to 140%, of the difference between the tangential coordinates of the centers of gravity of the blade sections situated firstly at the blade root and secondly at the interface between the intermediate segment and the distal segment. Such a blade presents sweep at the blade tip that is less pronounced than in the preceding situation, thereby making it easier to integrate in the turbomachine module, while preserving good aeronautical and mechanical properties. In particular, this makes it possible to increase the distance between the tips of the blade of the rotor and of the vane of the stator situated upstream.

In certain embodiments, the thickness of the blade is at all points less than 8% of the blade height, and preferably less than 6%. This reduced thickness provides the blade with good aerodynamic properties.

In certain embodiments, the thickness of the distal segment is less than 5% of the blade height, preferably less than 3%.

The present description also provides a single-piece blade disk having a plurality of blades in accordance with any of the above embodiments. Such a single-piece blade disk presents advantages of robustness and simplicity. Nevertheless, blades of the present description may alternatively be individually fastened blades, e.g. having a fir-tree shaped fastener member under the blade root.

The present description also provides a rotor having a plurality of blades in accordance with any of the above embodiments.

The present description also provides a turbomachine having a disk or rotor in accordance with any one of the above embodiments.

The above-described characteristics and advantages, and others, appear on reading the following detailed description of embodiments of the proposed blade. The detailed description refers to the accompanying drawings.

BRIEF DESCRIPTION OF THE DRAWINGS

The invention can be well understood and its advantages appear better on reading the following detailed description of an embodiment shown as a nonlimiting example. The description refers to the accompanying drawings, in which:

FIG. 1 is a diagrammatic longitudinal section of a turbomachine;

DETAILED DESCRIPTION OF THE INVENTION

Figure 2A:
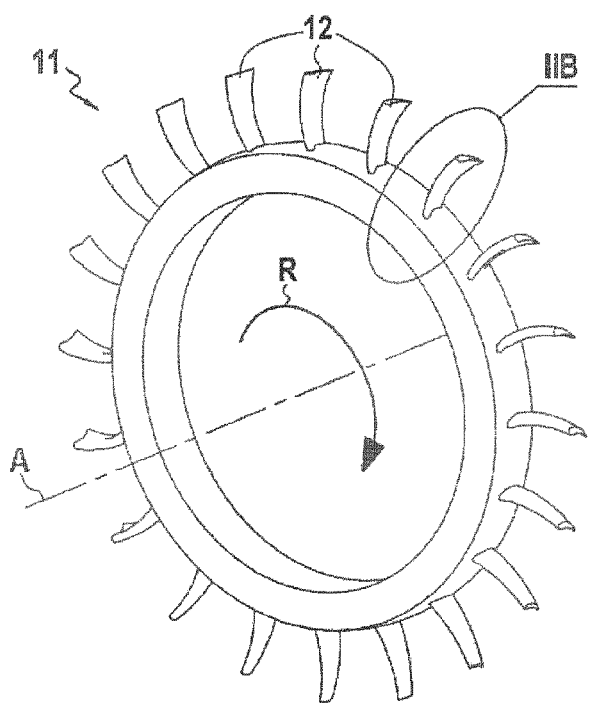
FIG. 2A is a diagrammatic perspective view of a turbomachine rotor.

FIG. 1 shows an illustrative example of a turbomachine, and more specifically of a bypass axial turbojet 1. The turbojet 1 shown has a fan 2, a low-pressure compressor 3, a high-pressure compressor 4, a combustion chamber 5, a high-pressure turbine 6, and a low-pressure turbine 7. The fan 2 and the low-pressure compressor 3 are connected to the high-pressure turbine 7 by a first transmission shaft 9, while the high-pressure compressor 4 and the high-pressure turbine 6 are connected together by a second transmission shaft 10. In operation, a flow of air compressed by the high- and low-pressure compressors 3 and 4 feeds combustion in the combustion chamber 5, and the expansion of the combustion gas drives the high- and low-pressure turbines 6 and 7. The turbines 6 and 7 thus drive the fan 2 and the compressors 3 and 4 by means of the shafts 9 and 10. The air propelled by the fan 2 and the combustion gas leaving the turbojet 1 via a propulsive nozzle (not shown) downstream from the turbines 6 and 7 together exert reaction thrust on the turbojet 1, and via the turbojet on a vehicle such as an airplane (not shown).

Each compressor 3, 4 and each turbine 6, 7 of the turbojet 1 comprises a plurality of stages, each stage being made up of a stationary set of vanes or stator, and a rotary set of blades or rotor. An axial compressor rotor 11 is shown diagrammatically in FIG. 2A. The rotor 11 has a plurality of blades 12 arranged radially around the axis of rotation A of the rotor 11, which axis is substantially parallel to the general direction of the flow of working fluid through the turbojet 1. The blades 12 may be integrated as a single part in the rotor 11, thereby forming a single-piece blade disk, or else they may be made separately and joined to the rotor by fastener means that are generally known in the state of the art, such as fir-tree fasteners.

Figure 2B:
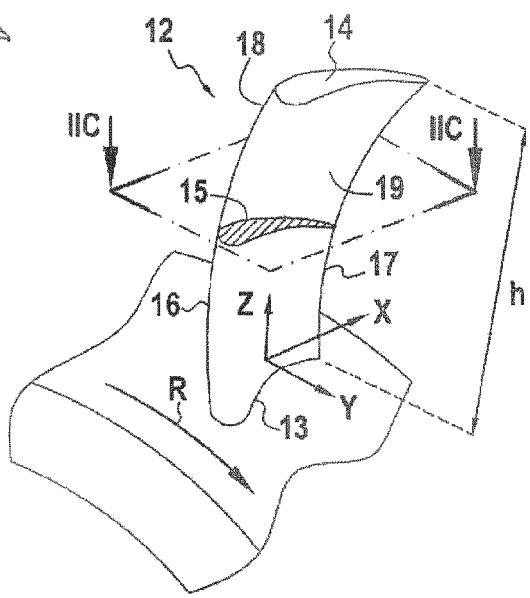
FIG. 2B is a diagrammatic perspective view of a detail of the FIG. 2A rotor.

As shown in greater detail in FIG. 2B, each blade 12 presents a three-dimensional reference frame having three orthogonal axes X, Y, and Z. The axis X is parallel to the axis of rotation A of the rotor 11, the axis Y is tangential to the direction of rotation R of the blade 12 about the axis of rotation A, and the axis Z is a radial axis in a direction intersecting the axis of rotation A. Each blade 12 comprises a blade root 13 and a blade tip 14 that are spaced apart by a blade height h in the direction of the radial axis Z. Between the blade root 13 and the blade tip 14, the blade 12 has a stack of aerodynamic profiles 15 in planes perpendicular to the radial axis Z, forming a leading-edge 16 in the upstream direction, a trailing edge 17 in the downstream direction, a suction side 18, and a pressure side 19. In a compressor or fan rotor, the direction of rotation R in normal operation is such that each blade 12 moves towards its pressure side 19.

Figure 2C:
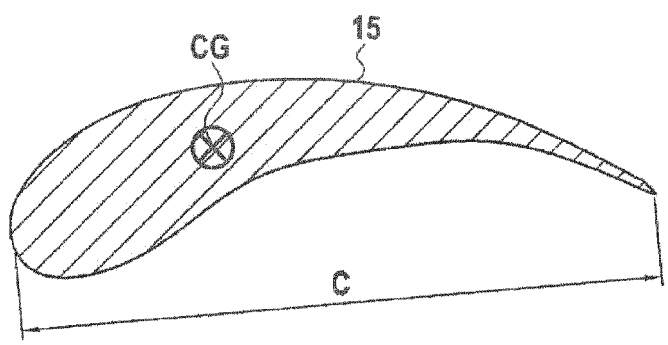
FIG. 2C is a cross-section view of one of the blades of the FIG. 2A rotor on a plane IIC-IIC shown in FIG. 2B.
Figure 3A:
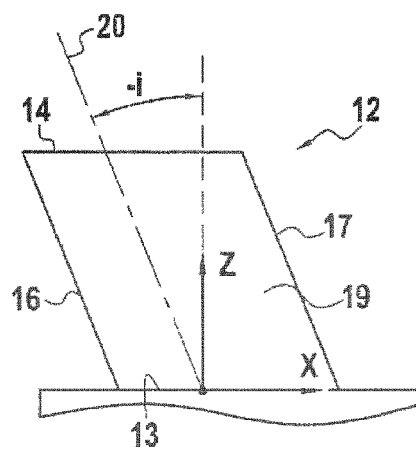
FIG. 3A shows a forwardly-swept rotor blade.
Figure 3B:
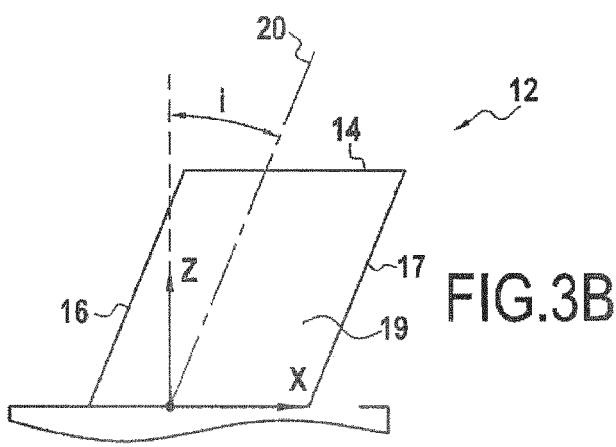
FIG. 3B shows a rearwardly-swept rotor blade.
Figure 3C:
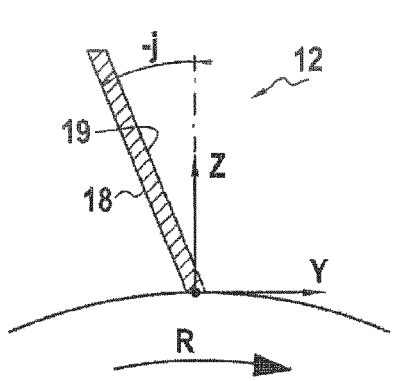
FIG. 3C shows a rotor blade presenting a negative tangential slope.
Figure 3D:
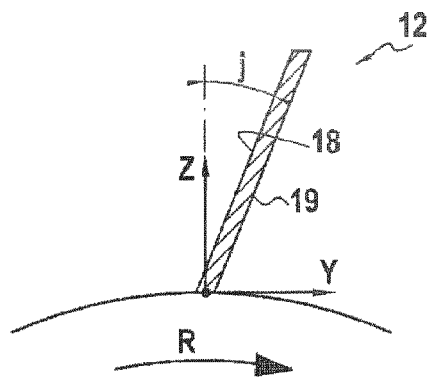
FIG. 3D shows a rotor blade presenting a positive tangential slope.

One such profile 15 of the blade 12 is shown in FIG. 2C. Each profile 15 presents a chord C between the leading edge 16 and the trailing edge 17, and a center of gravity CG defined as the geometrical centroid of the profile 15. In the field of turbomachine blades or vanes, the slope of the line passing through the centers of gravity CG of the successive profiles 15 relative to the radial axis Z is used to define the sweep and the tangential slope of a blade or vane 12. Thus, when, on going towards the tip 14, this line 20 slopes at an angle of inclination −i in an upstream direction in the XZ plane, as shown in FIG. 3A, the blade 12 presents a forward sweep. In contrast, when this line 20 slopes at an angle of inclination i in the downstream direction in the same plane, as shown in FIG. 3B, the blade 12 presents a backward sweep. In similar manner, the tangential slope is defined by the angle of inclination of the line 20 relative to the radial axis Z in the YZ plane. Thus, when, on going towards the tip 14, the line 20 slopes towards the suction side 18 (and thus in the direction opposite to the direction of rotation R of the rotor), the blade 12 slopes at a tangential angle of inclination −j that is negative as shown in FIG. 3C. In contrast, when this angle of inclination is towards the pressure side 19 (and thus in the direction of rotation R of the rotor), the blade 12 slopes at a tangential angle of inclination j that is positive, as shown in FIG. 3D. Apart from the sweep and the tangential slope, turbomachine blades or vanes generally present shapes that are complex, having profiles 15 in which the angle of attack, the camber, the thickness, and the chord C can also vary along the axis Z.

Figure 4:
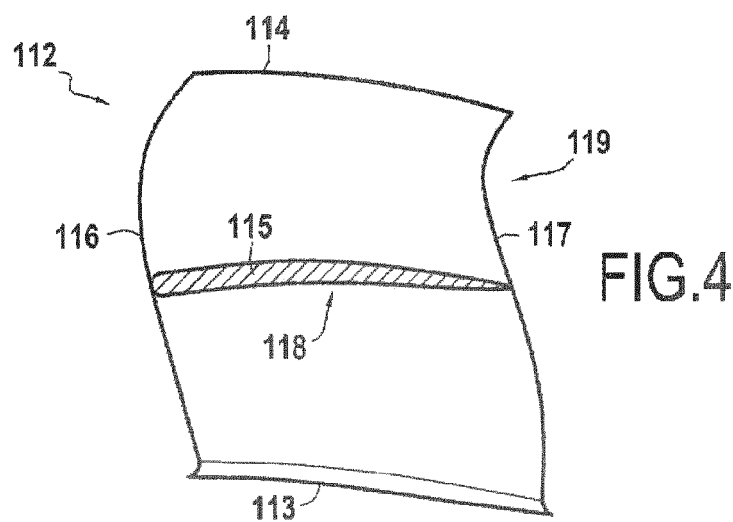
FIG. 4 shows an example blade of the invention.

FIG. 4 shows a blade or vane 112 in a first embodiment of the invention that enables this drawback to be mitigated for forwarding swept blades or vanes. This blade 112 also has a blade root 113, a blade tip 114, a leading edge 117, a trailing edge 116, a pressure side 118, and a suction side 119, and it is also made up of a stack of aerodynamic profiles 115 over the blade height h between the blade root 113 and the blade tip 114.

Figure 5:
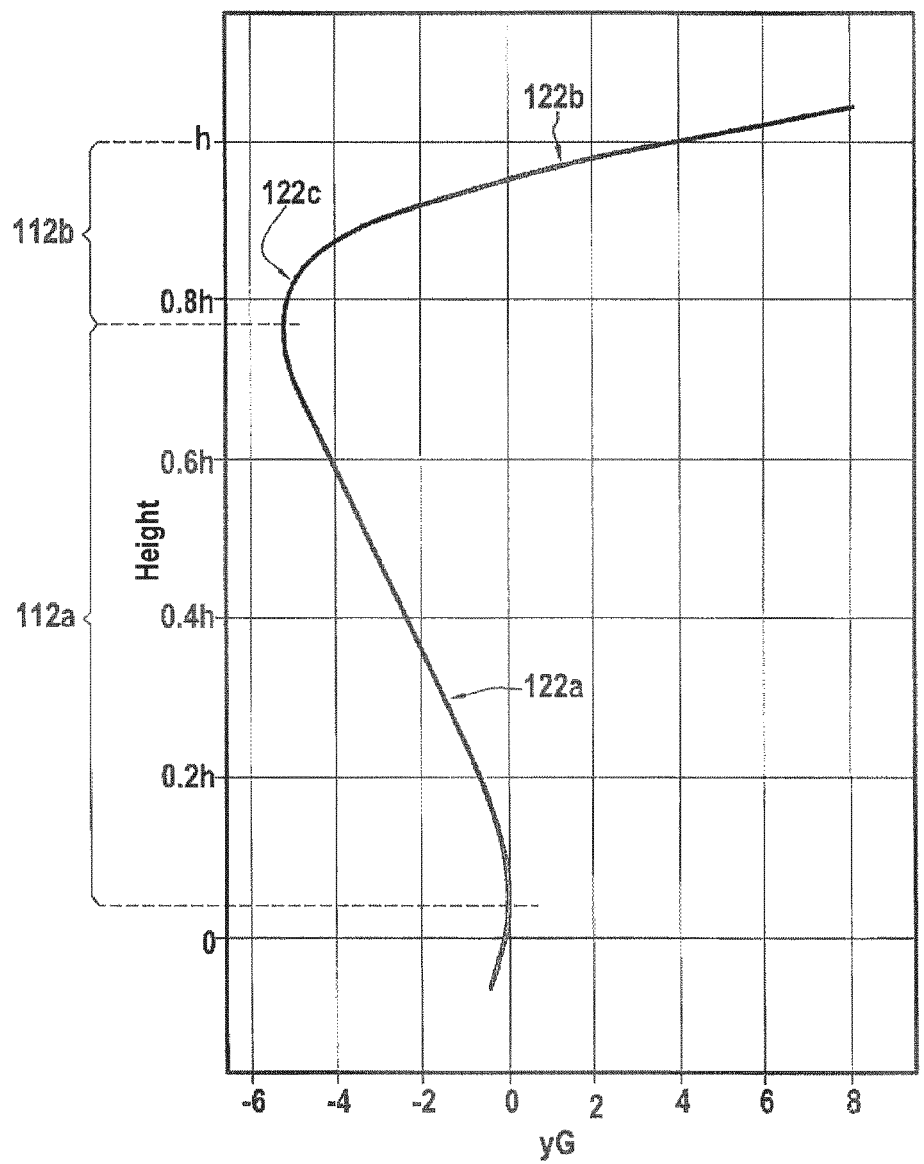
FIG. 5 is a diagram showing the variation, between the root and the tip, of the tangential slope of a first blade of the invention.

FIG. 5 shows the yG relationship of this blade 112, i.e. the way the tangential coordinate yG of the center of gravity CG varies along the radial axis Z. In FIG. 5, the yG abscissa axis is graduated in millimeters. The angle of inclination of this curve, i.e. the first derivative of yG, corresponds to the tangential slope of the blade: thus, when the curve goes towards the left, i.e. yG is negative, the corresponding portion of the blade has a negative tangential slope, and when the curve goes towards the right, i.e. yG is positive, the corresponding portion of the blade as a positive tangential slope. The curvature of this curve, i.e. the second derivative of yG, corresponds to the curvature of the blade in the tangential direction.

In this figure, it can be seen that this blade 112 presents an intermediate segment 112a with a negative tangential slope occupying about 70% of the blade height h up to a dimension corresponding to about 75% of the blade height h. The blade 112 also presents a distal segment 112b with a positive tangential slope extending between the intermediate segment 112a and the blade tip 114, and thus occupying about 25% of the blade height h.

It can also be seen that the intermediate segment 112a has a substantially rectilinear segment 122a extending almost between the dimensions corresponding to 15% and 70% of the blade height h. The distal segment 112b also has a substantially rectilinear segment 122b extending almost from the dimension corresponding to 90% of the blade height h to the blade tip 114. The curve for yG is thus Gamma-shaped. The curvature of the blade is then concentrated in a restricted zone 122c of the blade, mainly between the dimensions corresponding to 70% and 90% of the blade height h: the curve for yG thus turns through more than 900 in less than 20% of the blade height h, thereby contributing to decoupling the forces acting on the intermediate segment 112a and the distal segment 112b of the blade 112.

It can also be seen that the distal segment 112b extends strong from the positive yG side to reach about 4 mm at the blade tip, i.e. practically as much, in absolute value, as the coordinate reached on the negative yG side at the interface between the intermediate segment 112a and the distal segment 112b.

Figure 7:
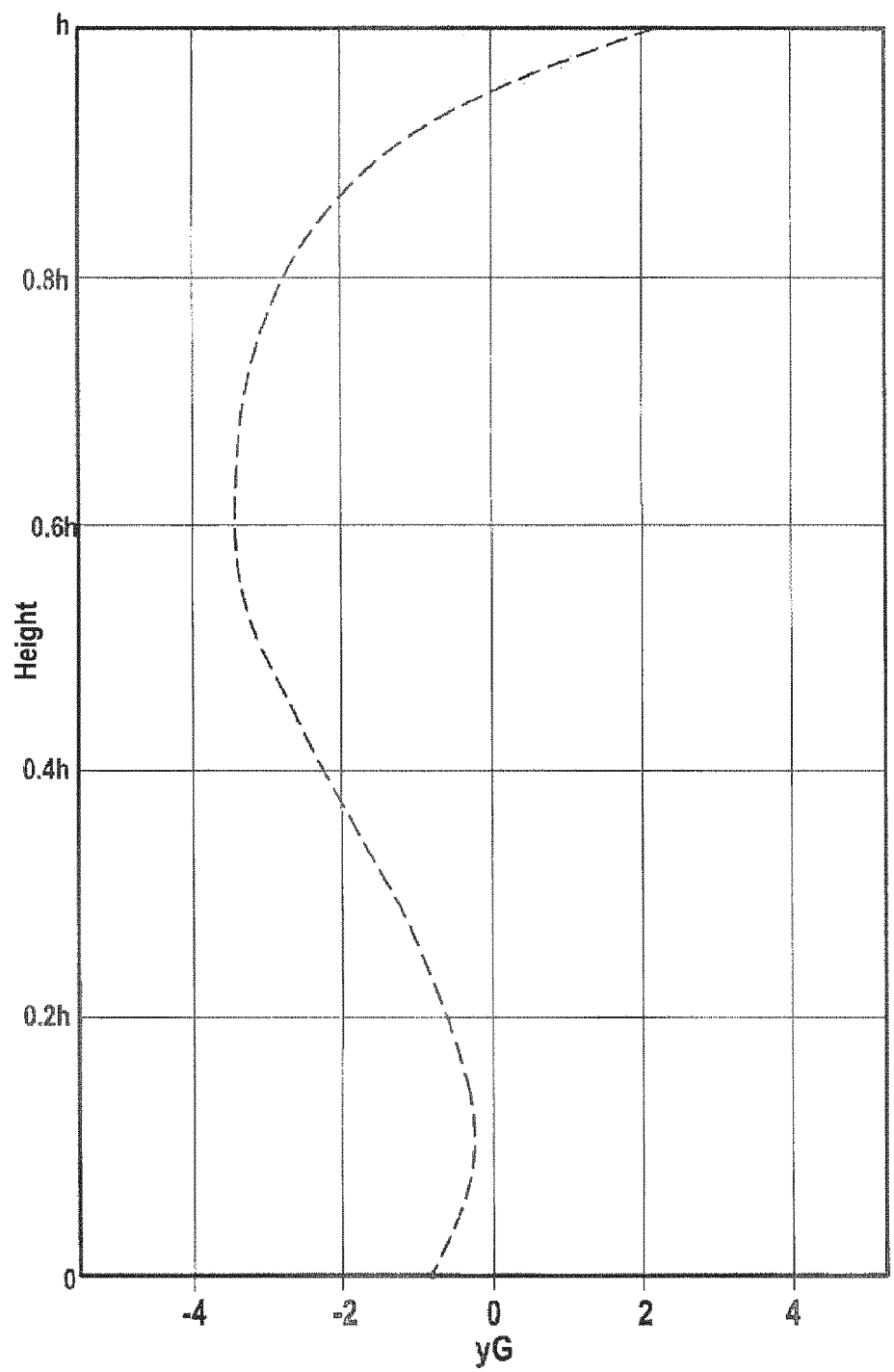
FIG. 7 is a diagram showing the variation, between the root and the tip, of the tangential slope of a reference prior art blade.
Figure 8A:
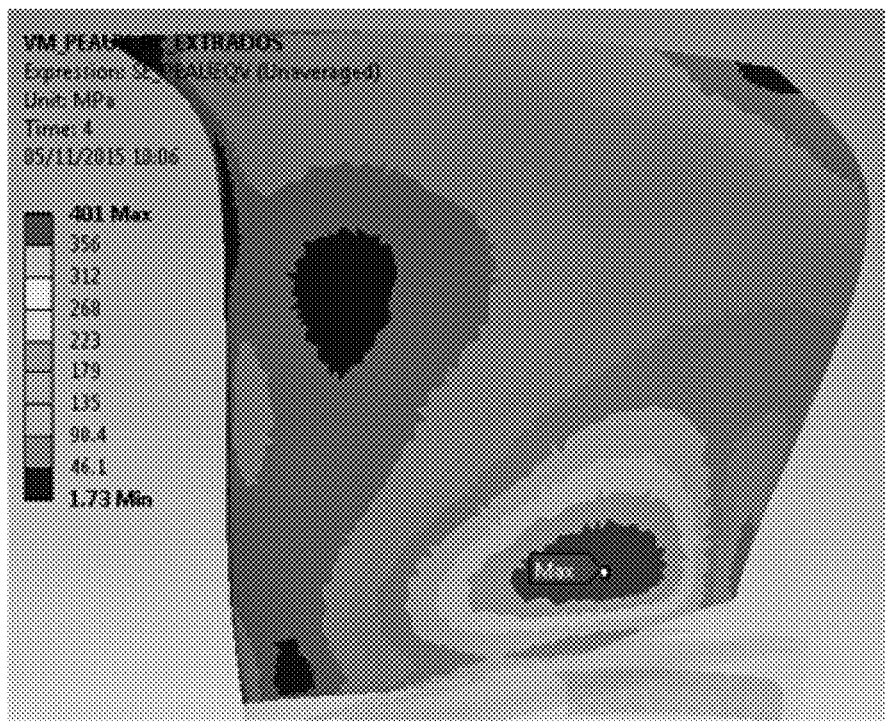
FIGS. 8A to 8B show the static stress levels of the first example blade.
Figure 8B:
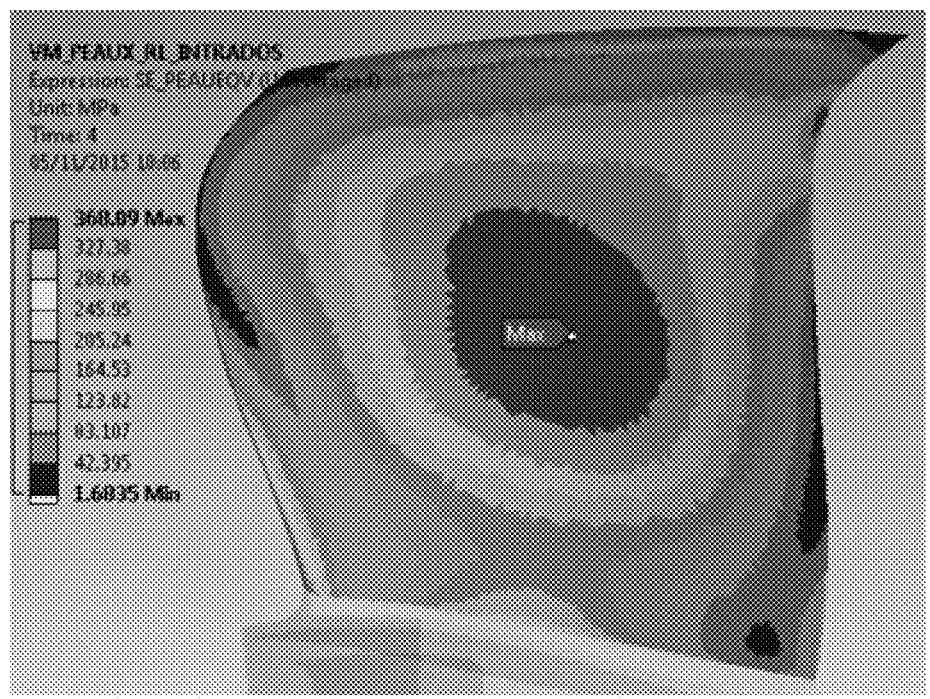
Figure 10A:
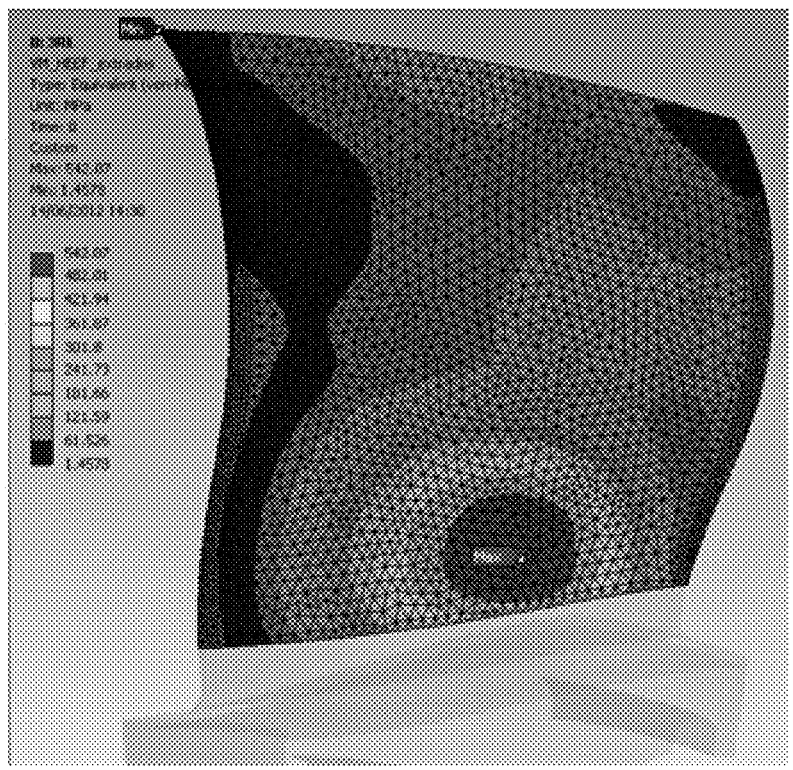
FIGS. 10A to 10B show the static stress levels of a conventional prior art blade.
Figure 10B:
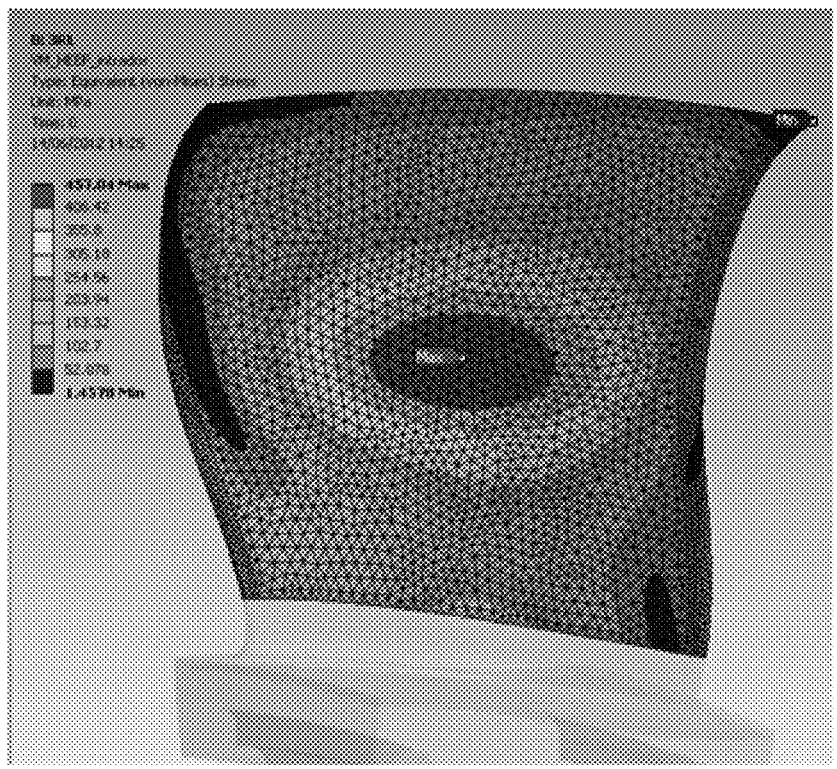

FIGS. 8A and 8B are screen captures of software for calculating mechanical stresses: they show the static stress levels respectively on the suction side and on the pressure side of the blade of the first example. For comparison, FIGS. 10A and 10B show the static stress levels respectively on the suction side and on the pressure side of a reference prior art blade for which the stacking relationship yG, as shown in FIG. 7, is S-shaped.

It can thus be seen that the maximum stress level at the suction side of the first example blade is 401 megapascals (MPa), while this maximum level is 542 MPa for the reference blade, i.e. a decrease of 26%. On the pressure side, the maximum stress level is 368 MPa for the blade of the first example compared with 457 MPa for the reference blade, i.e. a decrease of 19%.

Figure 6:
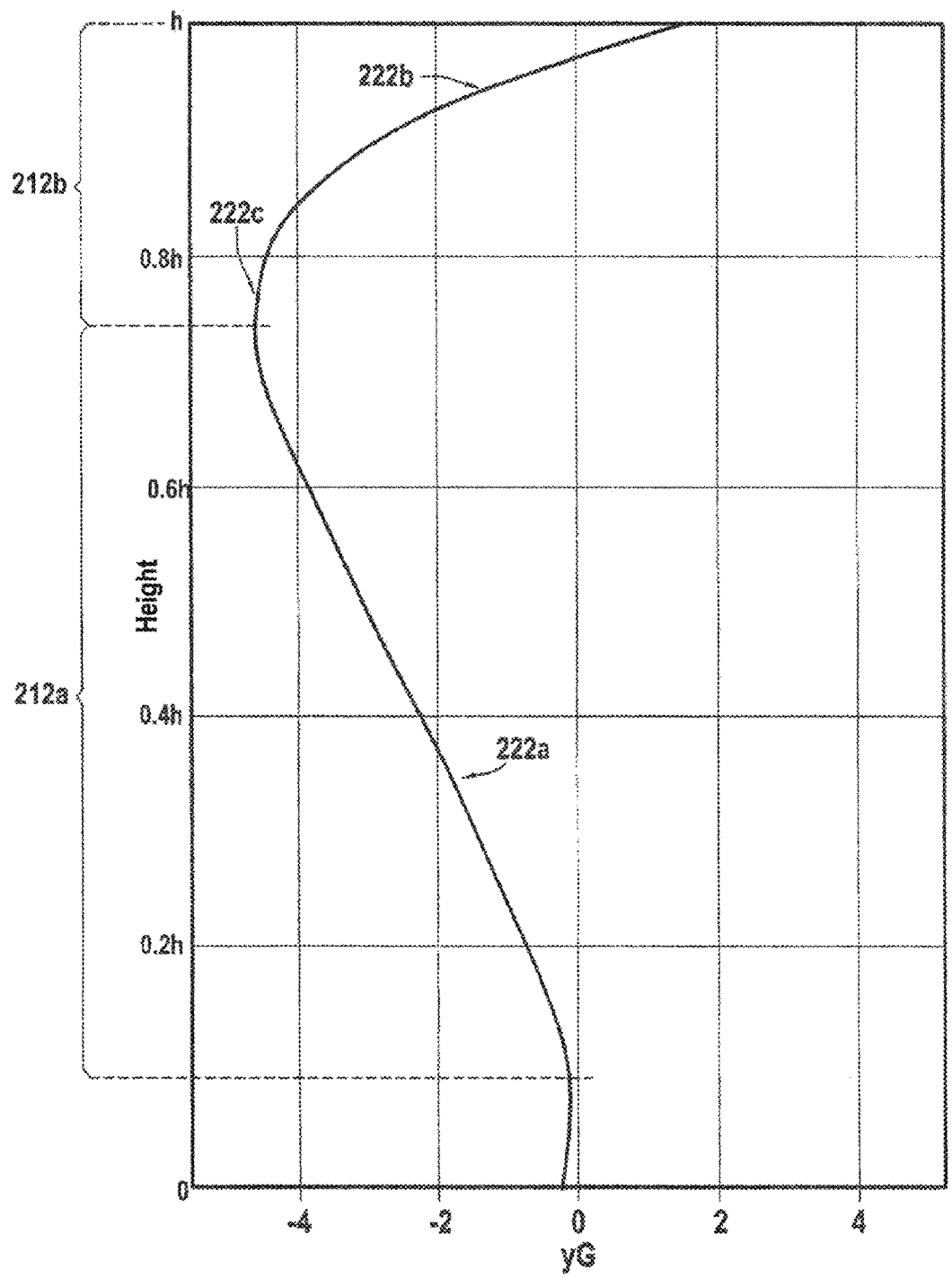
FIG. 6 is a diagram showing the variation, between the root and the tip, of the tangential slope of a second blade of the invention.

FIG. 6 shows the yG relationship for a second example blade. In this figure, it can be seen that the second blade presents substantially the same Gamma-shape except that its distal segment 212b does not extend as far as in the first example, reaching about 1.5 mm at the blade tip, i.e. about 30% in absolute value of the coordinate reached with negative yG at the interface between the intermediate segment 212a and the distal segment 212b.

In spite of that, there can be seen the presence of an intermediate segment 212a of negative tangential slope that occupies about 70% of the blade height h up to a dimension corresponding to about 75% of the blade height h, and a distal segment 212b with a positive tangential slope extending between the intermediate segment 212a and the blade tip, and thus occupying about 25% of the blade height h.

The intermediate segment 212a also has a substantially rectilinear segment 222a extending almost between the dimensions corresponding to 15% and to 70% of the blade height h. The distal segment 212b also has a substantially rectilinear segment 222b extending almost from the dimension corresponding to 90% of the blade height h to the blade tip 114. The curvature of the blade is then concentrated in a restricted zone 222c of the blade, mainly between the dimensions corresponding to 70% and to 90% of the blade height h: the curve for yG thus turns through more than 90° in less than 20% of the blade height h, thereby contributing to decoupling the forces acting on the intermediate segment 112a and the distal segment 112b of the blade.

Figure 9A:
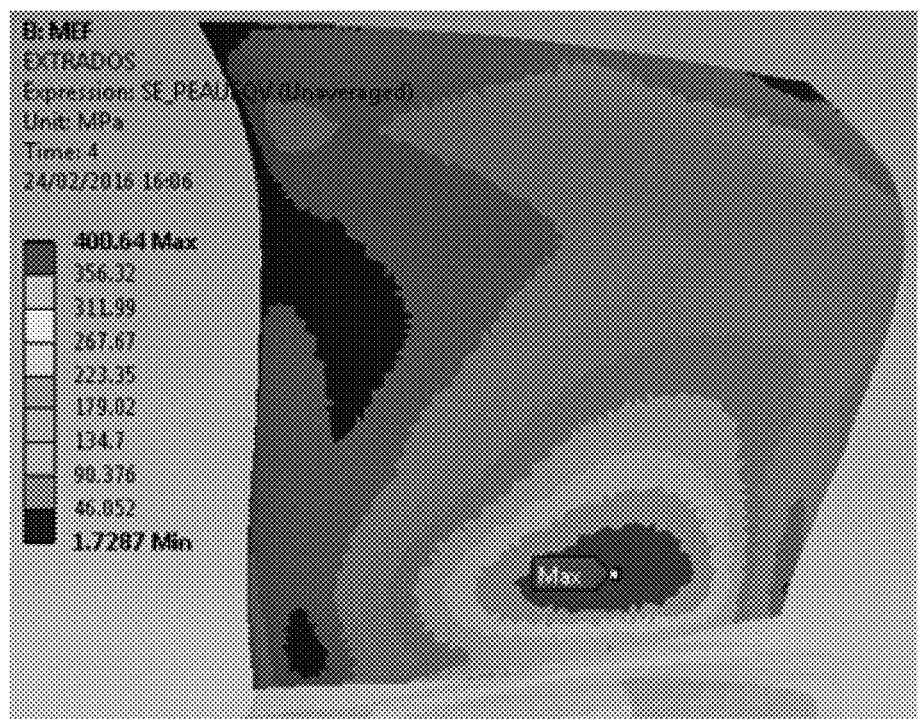
FIGS. 9A to 9B show the static stress levels of the second example blade.
Figure 9B:
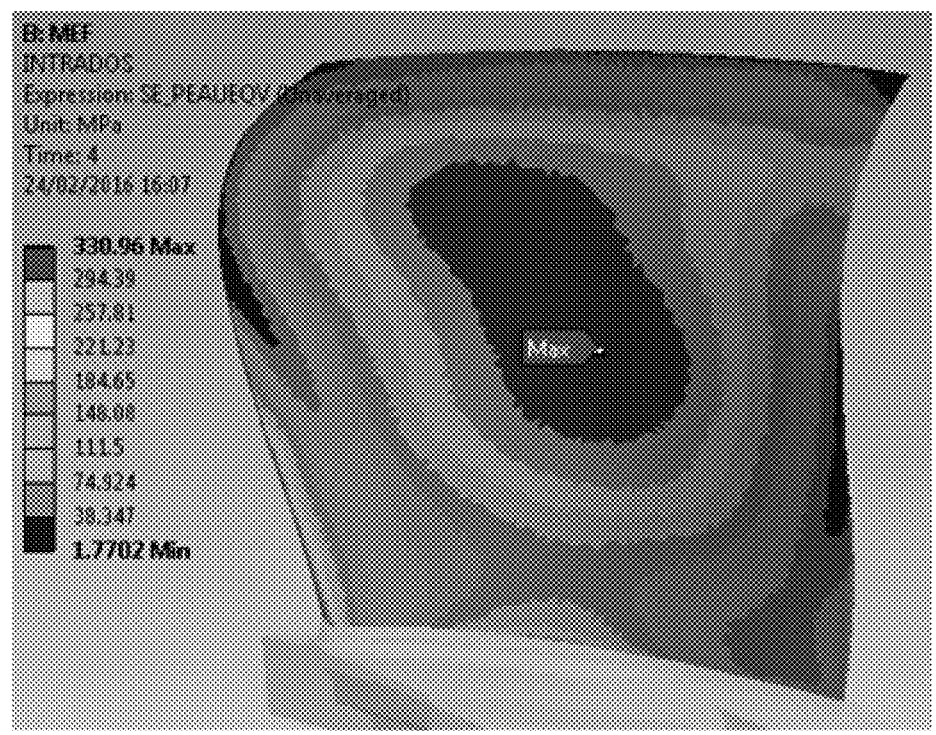

FIGS. 9A and 9B are once more screen captures of software for calculating mechanical stresses: they show the static stress levels respectively on the suction side and on the pressure side of the blade of the second example.

It can thus be seen that the maximum stress level at the suction side of the second example blade is 401 MPa, while this maximum level is 542 MPa for the reference blade, i.e. a decrease of 26%. On the pressure side, the maximum stress level is 331 MPa for the blade of the first example compared with 457 MPa for the reference blade, i.e. a decrease of 28%.

The embodiments described in the present description are given by way of nonlimiting illustration, and in the light of this description, a person skilled in the art can easily modify these embodiments, or envisage others, while remaining within the ambit of the invention.

Furthermore, the various characteristics of these embodiments may be used singly or they may be combined with one another. When they are combined, these characteristics may be combined as described above or in other ways, the invention not being limited to the specific combinations described in the present description. In particular, unless specified to the contrary, any characteristic described with reference any one embodiment may be applied in analogous manner to any other embodiment.

The invention claimed is:

1. A turbomachine rotor blade comprising:
a blade root and a blade tip spaced apart by a blade height;
at least one intermediate segment presenting a negative tangential slope; and
a distal segment situated between the intermediate segment and the blade tip and presenting a positive tangential slope,
wherein the distal segment extends over at most 30% of said blade height, and
wherein a projection onto a radial plane of a line passing through centers of gravity of each tangential section of the blade possesses, in the intermediate segment of the blade, a segment that is substantially rectilinear and that extends over at least 40% of the blade height.

2. The blade according to claim 1, wherein said distal segment is directly adjacent to said blade tip, and
wherein said distal segment is directly adjacent to said intermediate segment.

3. The blade according to claim 1, wherein said distal segment extends over at most 25% of the blade height.

4. The blade according to claim 1, wherein said distal segment extends over at least 5% of the blade height.

5. The blade according to claim 1, wherein said substantially rectilinear segment extends at least to a level situated at 50% of the blade height from the blade root.

6. The blade according to claim 1, wherein said substantially rectilinear segment extends from a level situated at at most 30% of the blade height from the blade root.

7. The blade according to claim 1, wherein the projection onto the radial plane of the line passing through the centers of gravity of each tangential section of the blade possesses, in the distal segment of the blade, a second segment that is substantially rectilinear.

8. The blade according to claim 1, wherein the second segment extends from a level situated at at most 90% of the blade height from the blade root.

9. The blade according to claim 7, wherein the projection onto the radial plane of the line passing through the centers of gravity of each tangential section of the blade turns through more than 90° in less than 20% of the blade height.

10. The blade according to claim 7, wherein the second substantially rectilinear segment is subhorizontal.

11. The blade according to claim 1, wherein a difference between the tangential coordinates of the centers of gravity of the blade sections situated firstly at the blade tip and secondly at an interface between the intermediate segment and the distal segment lies in a range 100% to 150% of the difference between the tangential coordinates of the centers of gravity of the blade sections situated firstly at the blade root and secondly at the interface between the intermediate segment and the distal segment.

12. The blade according to claim 1, wherein a thickness of the blade is at all points less than 8% of the blade height.

13. A single-piece blade disk comprising a plurality of blades according to claim 1.

14. A turbomachine including a disk according to claim 13.

15. A rotor having a plurality of blades according to claim 1.

16. The blade according to claim 1, wherein the projection onto the radial plane of the line passing through the centers of gravity of each tangential section of the blade presents a Gamma-shape.

* * * * *